W. H. ELLIOT.
Potato-Digger.
No. 61,058.
Patented Jan 8, 1867.
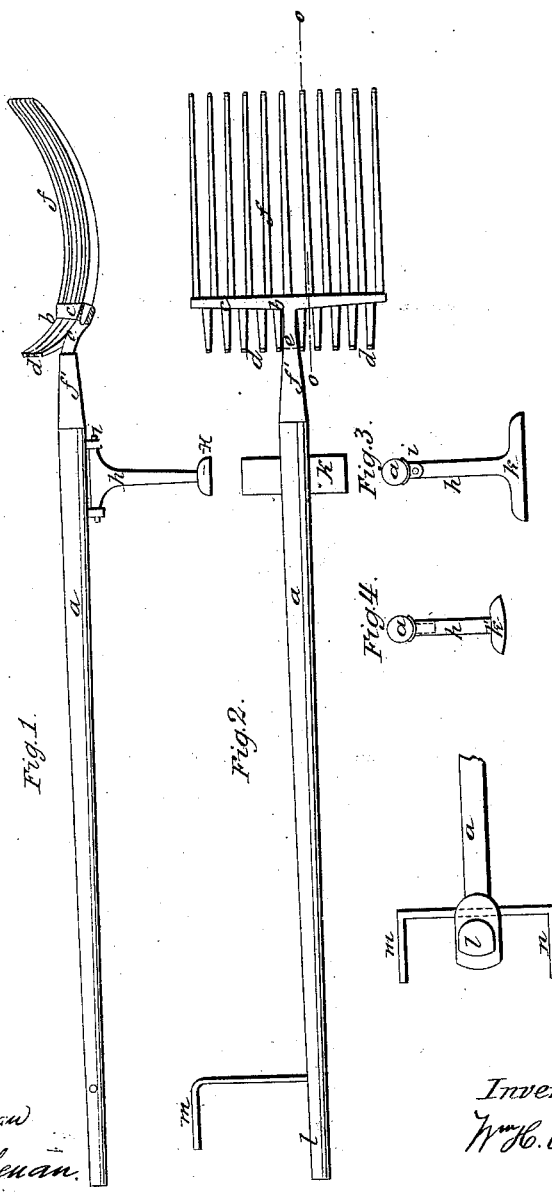

United States Patent Office.

WILLIAM H. ELLIOT, OF NEW YORK, N. Y.

Letters Patent No. 61,058, dated January 8, 1867.

---

IMPROVEMENT IN POTATO DIGGER.

---

The Schedule referred to in these Letters Patent and making part of the same.

---

TO ALL WHOM IT MAY CONCERN:

Be it known that I, WM. H. ELLIOT, of the city, county, and State of New York, have invented a new and improved Implement for Digging Potatoes; and I do hereby declare that the following is a full and exact description thereof, reference being had to the accompanying drawings and to the letters of reference marked thereon.

Similar letters of reference indicate the same devices in all the figures.

To enable others skilled in the arts to comprehend, make, and use my invention, I will proceed to describe its nature, construction, and operation.

The nature of my invention consists in providing a fork or digger for digging potatoes, with a support which serves as a fulcrum over which to raise the hill of earth and potatoes from the ground. Also, in providing it with two handles, at some distance apart, by which the digger may be easily rocked or rolled from side to side for the purpose of sifting the earth through the digger, so as to separate it from the potatoes. It also consists in attaching the support to the shaft of the digger by means of a parallel joint, and in providing the support with an elongated foot, standing at right angles to the joint and shaft of the digger.

Figure 1 is an elevation of my improved digger, showing the head in section at dotted lines $o$.

Figure 2 is a plan of my improved digger.

Figure 3 is a cross-section of my improved digger.

Figure 4 is the same, showing the support rigidly fixed to the shaft.

Figure 5 shows the ordinary spade-handle, with two auxiliary handles.

$a$, shaft of the digger; $b$, head of the digger, which should be of malleable iron. The head is composed of bar $c$, teeth $d$, which are cast upon the bar, and the shank $e$. The tines $f$ are riveted into the bar $c$, as shown in fig. 1. $f'$, ferrule; $h$, support; $i$, joint of the same, joining it to the shaft $a$; $k$, elongated foot; $l$, handle; $m$ and $n$, auxiliary handles; $k'$, curved foot of the support.

My invention refers particularly to digging potatoes, but may be used with facility for digging stones, or for any other similar purpose, and its operation is as follows: It is first thrust under a hill of potatoes, then, by depressing the shaft to a horizontal position, the support comes down to the ground and forms a fulcrum for the shaft, when the whole hill is raised from the grounds upon the tines of the digger; then, by means of the two handles, the digger is rolled violently from side to side, turning upon joint $i$, until the earth has all fallen through between the tines, and the potatoes are left upon them. The elongated foot serves to hold the support in an upright position during the operation.

There are many modifications of this invention, some of which I will mention. The joint $i$ may be placed over the shaft instead of under it. The shaft would thus be suspended upon the top of the support, the digger would be more easily held right side up, and the handle would give it a swinging motion from side to side. The support may be rigidly fixed to the shaft, as represented at fig. 4. In this case the digger would roll upon the ground instead of joint $i$. Handles constructed as represented by fig. 5 might be more convenient than those shown in fig. 2. There are other ways of constructing the head and tines, but I have shown what appears to me to be the most practical way of constructing and using my improved potato digger.

Having described my improved implement, without confining myself to any particular form or method of constructing, I desire to have secured to me by Letters Patent of the United States the following claims:

1. The support $h$, in combination with shaft $a$ and tines $f$, substantially as and for the purpose described.

2. Handle $l$, with one or more auxiliary handles, in combination with a support $h$, or their equivalents, for the purposes set forth.

3. Joint $i$, in combination with two or more handles, substantially as herein shown.

4. A joint, $i$, in combination with an elongated foot, $k$, substantially as and for the purpose specified.

WM. H. ELLIOT.

Witnesses:
HENRY LIEBENAU,
A. J. LIEBENAU.